US006438999B1

(12) United States Patent
Antos et al.

(10) Patent No.: US 6,438,999 B1
(45) Date of Patent: *Aug. 27, 2002

(54) DECREASED H2 SENSITIVITY IN OPTICAL FIBER

(75) Inventors: A. Joseph Antos, Elmira, NY (US); Cynthia B. Giroux, Wilmington, NC (US); Timothy L. Hunt, Christleton (GB); Dale R. Powers, Painted Post; Christine L. Tennent, Campbell, both of NY (US); William A. Whedon, Wilmington, NC (US)

(73) Assignee: Corning Incorporated, Corning, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/116,095

(22) Filed: Jul. 15, 1998

Related U.S. Application Data

(60) Provisional application No. 60/052,613, filed on Jul. 15, 1997.

(51) Int. Cl.[7] ............................................. C03B 31/027
(52) U.S. Cl. ............................. 65/399; 65/427; 65/426; 65/422
(58) Field of Search .......................... 65/427, 399, 426, 65/422

(56) References Cited

U.S. PATENT DOCUMENTS

| | | | | |
|---|---|---|---|---|
| 3,923,484 A | * | 12/1975 | Randall | 427/422 |
| 4,125,388 A | | 11/1978 | Powers | 65/3 |
| 4,165,224 A | * | 8/1979 | Irven | |
| 4,263,031 A | * | 4/1981 | Schultz | 65/30.1 |
| 4,294,514 A | * | 10/1981 | Schneider | |
| 4,310,341 A | * | 1/1982 | Barns et al. | 210/754 |
| 4,414,012 A | * | 11/1983 | Suto et al. | 65/30.1 |
| 4,620,861 A | * | 11/1986 | Berkey | 65/397 |
| 4,906,268 A | * | 3/1990 | Lane | 65/427 |
| 4,944,783 A | * | 7/1990 | Hongo et al. | 65/382 |
| 5,028,246 A | * | 7/1991 | Sarkar | 65/382 |
| 5,053,068 A | | 10/1991 | Kyoto et al. | 65/3.11 |
| 5,055,121 A | * | 10/1991 | Kanamori | 65/427 |
| 5,067,975 A | * | 11/1991 | Backer | 65/427 |
| 5,158,587 A | | 10/1992 | Kyoto et al. | 65/3.12 |
| 5,470,369 A | * | 11/1995 | Buchiya | 65/427 |
| 5,596,668 A | * | 1/1997 | DiGiovanni et al. | 385/123 |
| 5,641,333 A | * | 6/1997 | Burke et al. | 65/17.3 |
| 5,656,057 A | * | 8/1997 | Brown et al. | 65/384 |
| 5,713,979 A | * | 2/1998 | Nicholson | 65/427 |
| 5,838,866 A | * | 11/1998 | Antos et al. | 385/123 |

FOREIGN PATENT DOCUMENTS

| | | | |
|---|---|---|---|
| EP | 0 195 407 A1 | 9/1986 | |
| JP | 3-93641 | * 4/1991 | 65/427 |
| JP | 5-24854 | * 2/1993 | 65/427 |

OTHER PUBLICATIONS

English Abtract of JP57–062475, date: Oct.–1983.*
English Abstract of JP57–219071, date Jun.–1984.*
Grant & Hackh's Chemical Dictionary, 1991, pp. 531 & 273.*
Hackh's Chemical Dictionary (1991) p. 531.*

* cited by examiner

Primary Examiner—John Hoffmann
(74) Attorney, Agent, or Firm—Robert L. Carlson

(57) ABSTRACT

Disclosed is a method of making a hydrogen resistant optical waveguide fiber. The soot preform is heated and then immersed in a GeCl4 gas. A reduced metal species is thus incorporated into the glass soot prior to sintering or consolidation of the soot preform. A hydrogen absorption band around 1530 nm is substantially eliminated from waveguides made from a precursor gas treated preform.

11 Claims, 3 Drawing Sheets

DECREASED H2 SENSITIVITY IN OPTICAL FIBER

This application claims priority from Provisional application Ser. No. 60/052,613, filed Jul. 15, 1997.

FILED OF THE INVENTION

The invention relates to a method for decreasing the sensitivity of optical waveguide fiber to hydrogen. In particular, the method markedly reduces hydrogen induced attenuation in single mode optical waveguide fiber in a wavelength band centered about 1530 nm.

BACKGROUND OF THE INVENTION

Hydrogen can react with defects in silica based optical waveguide fibers to form unwanted signal absorption bands. A number of strategies have been developed to avoid the incorporation of hydrogen into the waveguide fiber, including sealed cables, hermetically coated waveguide fiber, and optical fiber cabling materials or coatings which act as hydrogen getters.

An example of the hydrogen getter approach is found in U.S. Pat. No. 5,596,668, DiGiovanni et al. ('668). The species for gettering or bonding with hydrogen, in this case a metal, is placed in the clad layer of the waveguide fiber. Diffusion of hydrogen into the light carrying portion of the waveguide is reduced and the waveguide is said to be hydrogen resistant. Care must be taken to prevent inclusion of the getter species into the core region and the part of the clad layer adjacent the core region. These regions carry the signal light and the presence of getter material in the regions would cause unacceptable signal attenuation. The '668 patent at column 3, II. 65–67 and in FIGS. 2, 3, and 4 makes clear the getter material must be located away from the light carrying part of the waveguide. This limitation together with the fact that hydrogen diffusion is not completely eliminated makes this approach less than optimum.

Providing the waveguide with a hermetic coating does essentially eliminate hydrogen induced attenuation. However, the application of the coating involves an additional process step which adds considerable cost in terms of raw materials, equipment, and manufacturing rate. Extra measurement steps to insure the hermeticity of the coating are also required.

An alternative getter method is one in which the getter material is incorporated in the waveguide polymer coating or in the materials which make up the cable. Such alternatives involve additional expense and the materials must be such that they will not degrade or otherwise leave the host material for the life of the waveguide, which is usually estimated in decades.

U.S. Pat. No. 4,125, 388, Powers ('388 patent), discloses and claims a method for making high purity optical waveguides, especially waveguides having very low concentrations of water. The inclusion of water in the silica-based glass matrix gives rise to broad absorption bands in wavelength ranges otherwise well suited to signal transmission. The '388 patent discloses and claims a method for making very low water waveguides by removing water from the soot preform during the step in which a soot preform is heated to fuse the soot particles into a glass. The '388 patent discloses the use of $Cl_2$ gas as a drying agent. The $Cl_2$ may be fed directly to the preform or a metal halide gas, such as $GeCl_4$ and $SiCl_4$, may be used together with an oxidizing agent to produce $Cl_2$ in the vicinity of the preform. The drying is carried out within a temperature range in which the soot will fuse into a dense glass.

In contrast to this drying method, the method of the present invention includes a step which precedes the drying step and which is carried out at a temperature below that at which the preform will be consolidated.

Thus there is a need in the waveguide fiber industry for a method of eliminating hydrogen sensitivity which method;

fits readily into the flow of the existing waveguide fiber manufacturing process;

does not cause a marked reduction in manufacturing rate;

is simple and cost effective; and, is built into the glass itself and so is reliable over the life of the waveguide.

SUMMARY OF THE INVENTION

The novel method and the resulting waveguide fiber derived therefrom disclosed and described here, meet the need for a low cost hydrogen resistant waveguide which has excellent long term reliability and which overcomes the deficiencies in the art noted above.

One embodiment of the invention relates to a method of making a hydrogen resistant optical waveguide fiber. A soot preform is fabricated by any one of several methods known in the art such as outside vapor deposition or axial vapor deposition. The method can be extended to include a modified inside vapor deposition preform manufacturing method by lengthening the time between soot deposition and soot consolidation or by including an excess of $GeCl_4$ or $SiCl_4$ with regard to oxygen. By any of several methods known in the art, at least a part of the central core region of the soot preform is made to have a refractive index higher than at least a part of the surrounding cladding glass layer. These methods can include co-deposition of a soot in the central region to raise the refractive index, co-deposition of a soot in the surrounding layer to lower the index, or treatment of the soot of either region with index modifying gases such as fluorine. Thus, modification of the refractive index can be accomplished during soot deposition or after soot deposition but prior to soot consolidation.

In one preferred embodiment, the method of deposition is the outside vapor deposition process, and $GeCl_4$ or $SiCl_4$ are employed to deposit a $GeO_2$ doped $SiO_2$ core region onto a bait rod. This is preferably followed by deposition of at least a minimal amount of a $SiO_2$ cladding region (additional cladding may also be deposited now or at a later stage, if desired). The bait rod is them removed, and the resultant soot preform can be treated in accordance with the invention. In one such embodiment, a metal halide gas (e.g. $GeCl_4$) is flowed around the soot preform (and through the hole left by removal of the bait rod, if one was employed to make the preform). Note that in the novel method described herein, the metal halide gas is preferably in excess relative to oxygen. This is in contrast to the smaller metal halide to oxygen ratio which is advantageous in a drying process.

In one embodiment of the present novel method, the soot preform is heated to a temperature greater than about 800° C. but less than the soot consolidation or sintering temperature. A metal halide gas which is a precursor of a glass forming metal oxide is then caused to flow through or about the hot, porous soot, preferably at a flow rate which is not less than about 0.2 standard cubic centimeters per minute (sccm) per 100 grams of soot glass. As is known in the art, the succeeding process steps can include sintering the soot to form a clear glass body, adding additional overcladding if needed or desired, and collapsing or sintering it, and then drawing a waveguide fiber from the resulting draw preform.

A flow rate of about 1 sccm or more per 100 g of soot glass is preferred, although a flow rate as low as 0.2 sccm/100 g is effective to improve hydrogen resistance. There is essentially no process reason for placing an upper limit on the flow rate. Thus the upper limit is dictated by material cost and equipment capability. A rate of 1.0 sccm/100 g is well within the capability of the equipment used to dry and sinter the soot preform.

The action of the metal halide gas on the soot preform is typically substantially complete in 1 hour. Variability in soot density may require that soot preform be exposed to the metal halide gas for longer time periods or shorter time periods may be effective. A range of about 0.5 to 10 hours has been found to cover the normally encountered range of soot densities and temperatures. In a preferred embodiment of the method, the soot preform is held near in the range of about 1000° C. to 1150° C. during immersion in the metal halide gas flow. However, the method is effective at least to temperatures as high as 1250° C.

The method works well when the index increasing core dopant is germania, although the method will be effective for other core glass dopants. Typical metal halide gases which may be used in the method include $GeCl_4$ and $SiCl_4$.

In an alternative embodiment, the same effect can be achieved by utilizing a soot deposition process, employing a metal halide precursor ($GeCl_4$) during soot deposition, and employing less than a stoichiometric amount of oxygen in the reaction chamber. In this manner, incorporation of an adequate amount of reduced Ge can be supplied outside the $GeO_2$ doped core.

A second aspect of the invention is a hydrogen resistant optical waveguide fiber made using the novel method.

A third aspect of the invention is a soot preform and a method of making a soot preform which is a precursor of a hydrogen resistant waveguide fiber. The method for making the soot preform includes the steps of depositing soot on any of several suitable soot collecting targets known in the art such as a bait rod of carbon, silica, or alumina, or on the inside or outside of a silica based glass tube. The soot comprises a silica layer and a core region of silica doped with an index raising material such as germania. Before sintering, the soot preform is heated and treated with a metal halide gas as before.

A fourth aspect of the invention is an optical waveguide fiber which contains reduced metal species (e.g. reduced germanium) in the core region or in the clad region immediately adjacent the core. The clad region immediately adjacent the core region is a ring of thickness 5 to 10 $\mu$m surrounding the core region.

The presence of such reduced metal species is the result of the treatment of the soot preform with a metal halide gas. The reduced metal species may be detected and quantified by any of a number of methods in the art. For example, the presence of reduced Ge may be quantified by measuring the absorption by the waveguide or waveguide glass preform of light having a wavelength near 240 nm. Absorbance is equal to $(1/t)\log(I_o/I)$, where t=sample thickness, $I_o$=incident intensity, and I=transmitted intensity. In the case of a glass made from a germanium halide gas treated soot preform, it has been found that an absorbance of not less than about 0.3/mm of 240 nm light, at a radial point located outside the $GeO_2$ doped region of the core, is indicative of hydrogen resistant glass. In one preferred embodiment, this region is present at or about halfway through the thickness of the adjacent clad ring, or greater than 1, more preferably greater than 3 microns outside the $GeO_2$ doped $SiO_2$ region. More preferably, the absorbance at this wavelength is less than about 0.2/mm. That is, sufficient reduced Ge is present in the glass to make a waveguide fiber which is hydrogen resistant.

DESCRIPTION OF THE PREFERRED EMBODIMENTS

Figure 1:
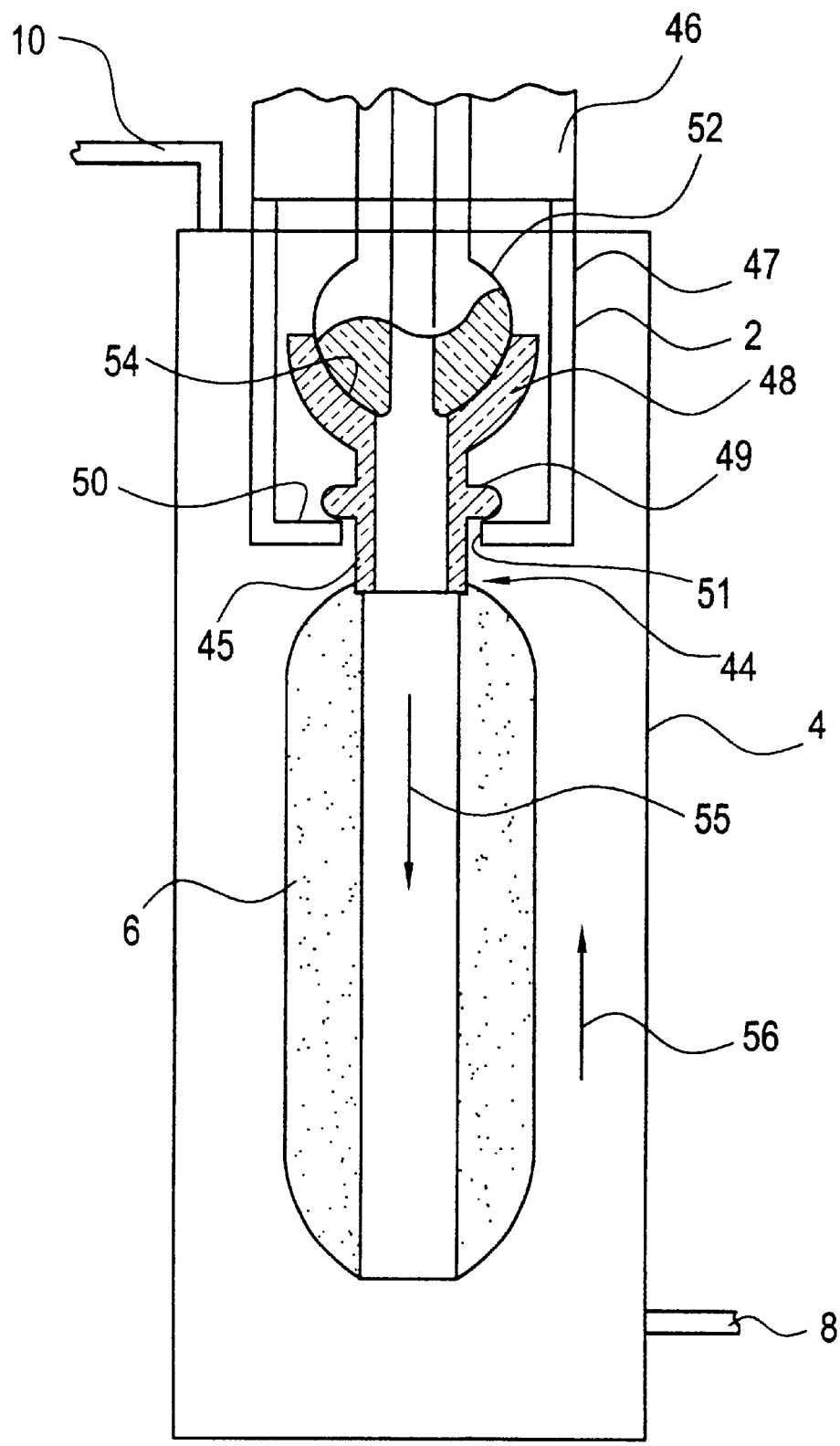
FIG. 1 is an illustration of a soot preform suspended in a furnace through which a metal halide gas may be flowed.

The novel method of making a hydrogen resistant optical waveguide fiber may be practiced using the soot deposition equipment, preform drying and consolidation equipment, and preform drawing equipment which is used in any of several alternative manufacturing processes known in the art. FIG. 1 shows a soot preform 6, made by any of several alternative processes, suspended by mechanical means 2 in a furnace 4.

Inlet 8 and outlet 10 provide a means of flowing a gas over the soot preform prior to sintering. It is believed that the flow of metal halide gas in this part of the waveguide manufacturing process (consolidation) is most effective in introducing reduced metal species into the soot preform. Further, it is believed preferable that the time lapse between metal halide gas flow and soot sintering be held to a minimum, and can, for example, include flowing the metal halide gas right up until the time that consolidation occurs or is complete. These beliefs are explanatory in nature and are not meant to limit the invention in any way. It will be understood that any of several alternative strategies may be used for flowing the metal halide gas into the furnace. For example, the inlet could be 10 and the outlet 8 in FIG. 1. In some instances the metal halide gas may be introduced into one or more tubular formations extending horizontally or vertically though the soot preform.

Handle 44 is suspended from a support tube 46 for insertion into consolidation furnace 15. Handle 44 comprises glass tube 45 having a flared joint 48 at its upper end and an annular enlargement 49 spaced from the joint 48. Support tube 46 has a slotted handle formed in the end thereof. One side of end region 47 of tube 46 is removed to accept the upper end of handle 44, enlargement 49 resting on slotted base 50 as the adjacent section of tube 45 is inserted into slot 51. At the end of gas conducting tube 53 is a ball joint 52 which fits into cavity 54 of joint 48.

Figure 2A:
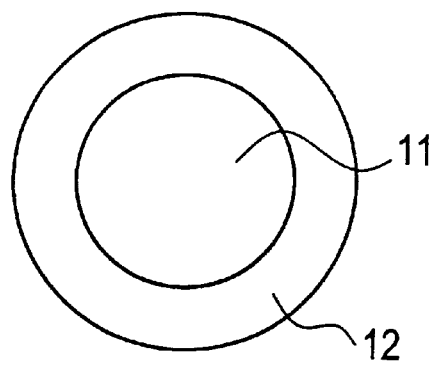
FIG. 2a is a cross section of a soot preform.
Figure 2B:
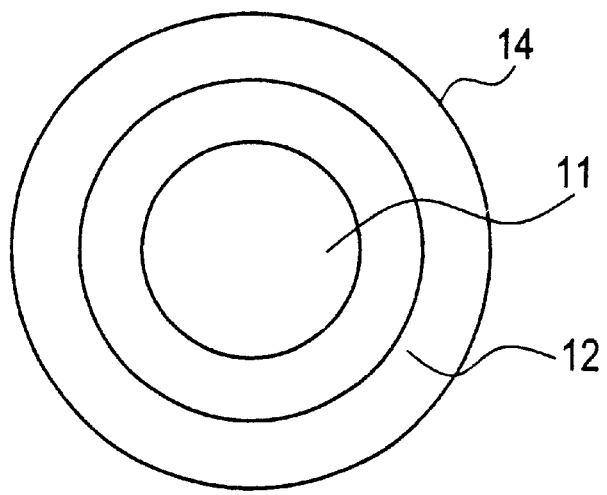
FIG. 2b is a cross section of a waveguide fiber or a draw preform.

The soot preform is preferably exposed to the metal halide gas for a time and temperature which is sufficient to result in a fiber which exhibits decreased sensitivity to hydrogen, e.g. a fiber which exhibits less than 0.05 dB/km increased attenuation at 1530 nm after exposure to a 1% hydrogen atmosphere for 6 days, more preferably less than than 0.03 dB/km increased attenuation at 1530 nm after exposure to a 1% hydrogen atmosphere for 6 days, most preferably less than than 0.01 dB/km increased attenuation at 1530 nm after exposure to a 1% hydrogen atmosphere for 6 days. The fact that such fibers, which have a decreased sensitivity to hydrogen, are possible without having to apply a hermetic coating to the fiber is a tremendous advantage over previous fibers. The cross section of a soot preform, FIG. 2a, shows the core soot 11 and the adjacent clad soot layer 12. This porous body made up of core and clad soot is heated in a furnace and immersed in the metal halide gas flow. Once the treatment with the metal halide gas is completed, the soot preform may be sintered to form a glass body and an additional layer of cladding glass 14 may be applied. Typically the extra clad layer is sleeved over or deposited upon the sintered preform. The resulting draw preform is illustrated in FIG. 2b which shows the core region 10, the adjacent clad layer 12 and the outer clad layer 14.

Figure 3:
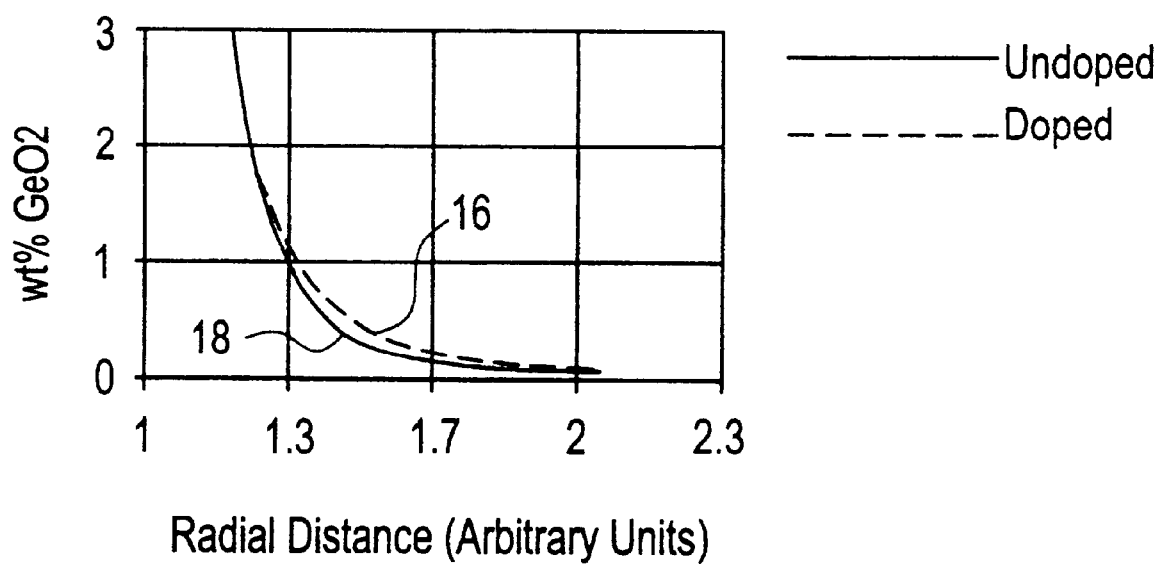
FIG. 3 is a chart of weight percent $GeO_2$ versus radial position in a glass preform.

The effect of flowing a metal halide gas over the heated soot preform during consolidation is illustrated in FIG. 3. FIG. 3 illustrates weight percent germania versus radial position in a sintered preform for both a metal halide gas (in this case $GeCl_4$) treated preform, curve 16, and an untreated preform, curve 18. The excess weight percent $GeO_2$ present in curve 16 is indicative of additional Ge in the glass matrix. The x-axis is divided into arbitrary units of length. The portion of the preform illustrated in FIG. 3 is only the portion that is located at the interface between the core glass region and the clad glass layer. The excursion of curve 16 above curve 18 indicates that germanium from the $GeCl_4$ gas flow has been taken up into the preform matrix. The 240 nm light absorbence measurement confirms that the Ge is in its reduced form.

While not wanting to be bound by theory, applicants believe that the mechanism which makes the resulting waveguide fiber hydrogen resistant is as follows. Defects exist in the glass matrix which are due to the presence of excess oxygen. Treating the soot preform with a metal halide (M Clx, where M stands for metal and x depends upon the metal valence) causes metal atoms to be inserted into the matrix, eliminating surplus oxygen and the associated defect. Thus, treating the soot preform with a pre-selected gas substantially eliminates bonds prone to forming draw induced or otherwise stress induced defects. This model fits well with the behavior of atoms in a glass matrix and does explain pertinent hydrogen absorption bands observed in testing. It will be understood however that the invention is in no way limited by this model and does not depend upon the correctness of the model.

The invention is further illustrated by the following examples which are meant to be illustrative and in no way limiting.

EXAMPLE 1 (COMPARATIVE)

Heating without a Precursor Gas

A soot preform was fabricated using an outside vapor deposition method in which glass soot was deposited upon a bait rod. The core region comprising silica and germania was deposited. A layer of silica was deposited about the core region. The bait rod was removed and the soot preform was placed in a furnace and heated to 1000° C. For a 1 hour time period, 20 slpm of He was flowed around the preform and 0.7 slpm of He was passed through the preform center opening. Then for a 3 hour time period, a flow of 0.07 slpm of $Cl_2$ was added to the flow of He gas in the preform center opening. The $Cl_2$ flow was stopped and the furnace temperature was raised and the preform was sintered to form a clear glass body. The sintering process is known in the art and will not be further described here. The nominal diameter of the sintered glass body was 7 mm. The portion of the sintered glass body characterized as the waveguide cane had a nominal diameter of 3.5 mm.

The absorption of 240 nm light at three positions in the silica layer was measured to estimate the amount of reduced Ge incorporated therein. The measurements were:

near the core region clad layer interface—0.27;

0.75 mm further out in the clad from the core—clad interface—0.09; and, 1.25 mm further out in the clad from the core interface—0.03. These readings indicate the diffusion of Ge from the core region is not appreciable a few millimeters from the core region.

A waveguide fiber made using this preform was tested in a 1% hydrogen atmosphere for 6 days. The pressure in the testing chamber was 1 atmosphere and the chamber was held at room temperature. The increase in attenuation at 1530 nm was measured to be 1.450 dB/km.

EXAMPLE 2

Heating with a Metal Halide Gas

A soot preform was fabricated using a process identical to that in the example above, except that the preform was treated with metal halide gas in accordance with the invention.

The soot preform was placed in a furnace and heated to 1000° C. For a 1 hour time period, 20 slpm of He was flowed around the preform and 0.7 slpm of He was passed through the preform center opening. Then for a 3 hour time period, the center flow was maintained and a flow of 1 sccm/100 g of $GeCl_4$ was added to the 20 slpm flow. The $GeCl_4$ was stopped and the furnace temperature was raised and the preform sintered to form a clear glass body using a process identical to that in the example above and resulting in an essentially identical sintered preform geometry.

The absorption of 240 nm light at the same three positions in the silica layer as before, was measured to estimate the amount of reduced Ge incorporated therein. The measurements were:

near the core region interface—2.1;

0.75 mm further out from the core interface—1.8; and, 1.25 mm further out from the core interface—1.2. This indicates that additional Ge has been incorporated into the metal halide gas treated preform.

A waveguide fiber made using this preform was tested in a 1% hydrogen atmosphere for 6 days. The pressure in the testing chamber was 1 atmosphere and the chamber was held at room temperature. The increase in attenuation at 1530 nm was measured to be 0.004 dB/km which is very near the noise floor of the measurement. The incorporation of reduced Ge into the preform in the clad layer adjacent the core region was shown to be effective to essentially eliminate hydrogen sensitivity in a wavelength band centered at 1530 nm.

Although specific embodiments of the invention have herein been disclosed and described, it is understood that such detail is solely for that purpose and variations can be made without departing from the spirit and scope of the invention which is defined by the following claims.

What is claimed is:

1. A method of making a treated soot preform which is a precursor of a hydrogen resistant waveguide fiber, comprising the steps of:

fabricating a soot preform comprising a central core region surrounded by and in contact with a clad region; and, after said fabricating step, heating said preform in a gaseous environment to a temperature greater than about 800° C. but less than the consolidation temperature thereof and then, after said heating step, adding $GeCl_4$ gas to the gaseous environment and exposing said preform to the gas while maintaining the preform below its consolidation temperature for a time and temperature which is sufficient to treat said preform with the gas so that, when said preform is employed in a fiber draw process for making an optical fiber, the resultant fiber exhibits less than 0.05 dB/km increased attenuation at 1530 nm after exposure to a 1% hydrogen atmosphere at a pressure of 1 atm for 6 days.

2. The method of claim 1, wherein the central core region and the clad region of said preform in said exposing step are both comprised of silica based soot.

3. The method of claim 2, wherein the resultant fiber exhibits less than 0.03 dB/km increased attenuation at 1530 nm after exposure to a 1% hydrogen atmosphere at a pressure of 1 atm for 6 days.

4. The method of claim 2, wherein said step of exposing comprises heating the soot preform to a temperature greater than 800° C. but less than the sintering temperature of both the core region soot and the clad region soot.

5. The method of claim 2, wherein said exposing step comprises maintaining the soot preform at a substantially constant temperature.

6. The method of claim 2, wherein said exposing step comprises flowing said gas around or through said soot preform.

7. The method of claim 2, further comprising sintering the preform to form a clear glass body.

8. The method of claim 7, further comprising providing additional cladding soot material over the clear glass body to form a draw preform and drawing an optical waveguide fiber from said draw preform.

9. The method of claim 2, wherein the time duration of said exposing step is in the range of about 0.5 to 10 hours.

10. The method of claim 2, wherein the temperature in said exposing step is less than about 1250° C.

11. The method of claim 2, wherein the temperature in said exposing step is in the range of about 1000° C. to 1150° C.

* * * * *